Patented July 6, 1937

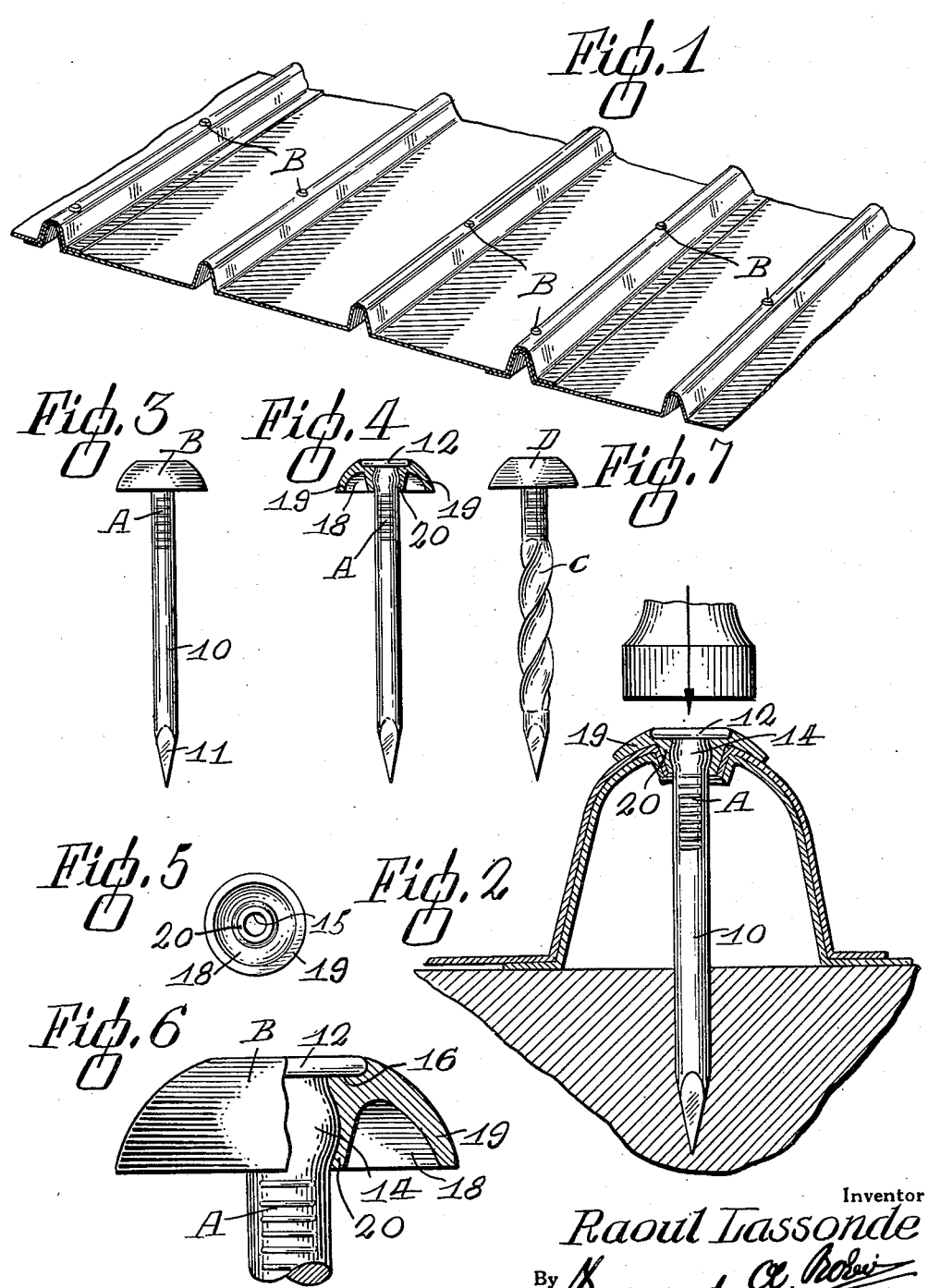

2,086,086

UNITED STATES PATENT OFFICE 2,086,086

FASTENER SEAL

Raoul Lassonde, St. Hyacinthe, Quebec, Canada

Application March 27, 1936, Serial No. 71,190

3 Claims. (Cl. 85—28)

The present invention relates to sealing attachments for nails and similar fasteners.

An object of the invention is the provision of a fastener seal which will form a water-tight seal about the fastener when driven into fastening position.

Another object of the invention is the provision of a fastener seal which may be conveniently driven into sealing position with the fastener.

A further object of the invention is the provision of a fastener seal of the aforesaid character which will prevent corrosion of the fastener.

Other objects and advantages of the invention will become apparent as the description progresses.

In the accompanying drawing forming a part of this specification and in which like reference characters are employed to designate corresponding parts throughout the same:

Figure 1 is a perspective view showing sheet roofing secured by the improved device, Figure 2 is an enlarged section showing the fastener and seal in fastening position, Figure 3 is a side elevational view of a nail equipped with the sealing attachment, Figure 4 is a similar view showing the sealing device in section, Figure 5 is a bottom plan view of the sealing device detached from the nail, Figure 6 is a fragmentary elevation of the sealing device on the nail partly broken away, and Figure 7 is a side elevational view showing the sealing device on a modified form of nail.

Referring to the preferred form of the invention illustrated at Figures 1 to 6 inclusive, A designates a nail having a straight shank 10 pointed at the bottom as indicated at 11 and formed at the opposed end with a flat round head 12. Immediately adjacent the head the shank of the nail is formed with a rounded bulbous dilatation 14, the purpose of which will be later described. At the head end portion of the nail is adapted to be fitted a sealing element B formed with a through bore 15 and a shallow counterbore 16 in the top. In the underside of this sealing ring element is formed an annular groove 18 providing a peripheral flaring flange or skirt 19 and an interior tubular sleeve 20. This sleeve is preferably formed so as to provide an exterior diminishing taper toward the outer end, as shown to advantage at Figure 6.

The ring B is preferably formed of relatively soft material such as lead and is tightly fitted on the nail or fastener A, the sleeve 20 tightly embracing the dilatation 14 while the nail head 12 fits snugly into the top counterbore 16.

The device is particularly adapted for fastening sheet metal roofing, sheathing, and the like. As the nail provided with the sealing attachment is driven into position, as for instance through the joints of corrugated roofing shown at Figures 1 and 2, the tapered sleeve 20 is forced into the nail hole about the head end of the shank and provides a tight sealing connection at this point. At the same time, the flange or skirt portion 19 is spread laterally and forms an annular boss-like formation about the nail hole and the nail head so as to increase the sealing area and effectively prevent infiltration of water, or other foreign matter into the hole.

As shown at Figure 7, the device may be also effectively employed in connection with a helical shank nail C, the sealing ring D being secured in the same manner as on a straight nail. The rotation of the nail will not interfere with the proper positioning of the sealing device and will likewise form an effective water-tight sealing structure.

It is to be understood that the forms of my invention herein shown and described are to be taken as preferred examples of the same, and that various changes as to the shape, size and arrangement of parts may be resorted to without departing from the spirit of the invention or the scope of the subjoined claims.

Having thus described my invention, I claim:—

1. In a fastener seal, a nail having a bulbous enlargement formed adjacent the head and independent thereof, a ring of relatively soft material having a flaring peripheral skirt portion and a tubular sleeve adapted to be tightly fitted about the enlarged portion of the nail.

2. A device of the character described comprising a nail having a shank and a head formed at one end of the shank, a bulbous enlargement formed on the shank adjacent the head, and a sealing ring adapted to be fitted on the nail, the said ring being formed to provide a peripheral flaring skirt portion and a tubular sleeve adapted to tightly embrace the enlarged portion of the nail shank.

3. A device of the character described comprising a nail having a shank and a head formed at one end of the shank, a bulbous enlargement formed on the shank adjacent the head, and a sealing ring adapted to be fitted on the nail, the said ring being formed to provide a peripheral flaring skirt portion and a tubular sleeve adapted to tightly embrace the enlarged portion of the nail shank, the said sealing ring having a counterbore in the top disposed to snugly receive the head of the nail therein.

RAOUL LASSONDE.